United States Patent [19]

Brunelle et al.

[11] Patent Number: 4,857,296
[45] Date of Patent: Aug. 15, 1989

[54] CEO CATALYTIC DESULFURIZATION OF INDUSTRIAL GASES

[75] Inventors: Jean-Pierre Brunelle, Saint Brice Sous Foret; Patrice Nortier, Romainville; Eric Quemere, Cormeilles en Parisis, all of France

[73] Assignee: Rhone-Poulenc Chimie, Courbevoie, France

[21] Appl. No.: 136,989

[22] Filed: Dec. 23, 1987

[30] Foreign Application Priority Data

Dec. 23, 1986 [FR] France ............................ 86 18056

[51] Int. Cl.$^4$ ..................... C01B 17/02; C01B 17/16; C01B 31/20; B01J 8/00
[52] U.S. Cl. ............................. 423/574 R; 423/21.1; 423/230; 423/244; 423/263; 423/576
[58] Field of Search ............... 423/230, 244 A, 244 R, 423/21.1, 263, 242 A, 242 R, 574 R, 576

[56] References Cited

U.S. PATENT DOCUMENTS

| 3,116,970 | 1/1964 | Storp et al. | 423/230 |
| 3,974,256 | 8/1976 | Wheelock et al. | 423/230 |
| 3,978,200 | 8/1976 | Bajars | 423/570 |
| 4,346,063 | 8/1982 | Cahn et al. | 423/230 |
| 4,399,112 | 8/1983 | Voirin | 423/230 |
| 4,532,119 | 7/1985 | Dupin | 423/230 |
| 4,661,330 | 4/1987 | Chane-Ching et al. | 423/263 |
| 4,714,598 | 12/1987 | Kay et al. | 423/230 |

FOREIGN PATENT DOCUMENTS

| 0141998 | 5/1985 | European Pat. Off. |
| 0153228 | 8/1985 | European Pat. Off. |
| 2242144 | 3/1975 | France |
| 2540092 | 8/1984 | France |

Primary Examiner—Gregory A. Heller
Attorney, Agent, or Firm—Burns, Doane, Swecker & Mathis

[57] ABSTRACT

The desulfurization of industrial gases by the catalytic conversion of contaminating sulfur values therein, comprising, e.g., either Claus process or hydrolysis of organosulfur compounds, is carried out in the presence of an effective amount of a cerium oxide-based catalyst.

14 Claims, No Drawings

CEO CATALYTIC DESULFURIZATION OF INDUSTRIAL GASES

BACKGROUND OF THE INVENTION

1. Field of the Invention:

The present invention relates to the treatment of industrial gases to eliminate recoverable sulfur values therefrom, and, more especially, to the catalytic conversion of such gases (containing hydrogen sulfide, sulfur dioxide and/or such organosulfur compounds as CS2 and COS) utilizing particular cerium oxide-based catalyst.

2. Description of the Prior Art:

The conventional Claus process for, e.g., the recovery of sulfur from gases containing hydrogen sulfide and ofttimes organic sulfur compounds, comprises two stages.

In a first stage, the hydrogen sulfide is burned in the presence of a regulated amount of air to convert a portion of this gas into sulfur dioxide, and, in a second stage, the gaseous mixture thus produced is charged through a series of reactors containing a catalyst, wherein the following reaction takes place:

$$2H_2S + SO_2 \rightarrow 3S + 2H_2O \qquad (I)$$

Claus gases may contain, in addition to hydrogen sulfide, carbonaceous sulfur compounds, such as COS and $CS_2$, which are relatively stable to the conditions of catalytic conversion and which contribute to increased $SO_2$ emissions, a increase of up to 20 to 50%. Claus gases may also contain those sulfur compounds usually present in the atmosphere following the incineration of flue gases. These toxic compounds are either already contained in the gases to be treated, or are formed therein over the course of the first stage at elevated temperatures.

These compounds may be eliminated according to several types of reactions, in particular, by hydrolysis according to the following reactions (2), (3) and/or (4):

$$CS_2 + 2H_2O \rightarrow CO_2 + 2H_2S \qquad (2)$$

$$CS_2 + H_2O \rightarrow COS + H_2S \qquad (3)$$

$$COS + H_2O \rightarrow CO_2 + H_2S \qquad (4)$$

Various catalysts and techniques are known to this art for the catalytic conversion of organic sulfur compounds present in industrial gases.

Thus, alumina has long been employed as a catalyst for this type of reaction. However, alumina displays but mediocre performance relative to the elimination of the aforementioned organosulfur compounds.

Recently, titanium oxide has been used for such catalytic conversion. It displays catalytic activity clearly superior t that of alumina in the elimination of organosulfur compounds. Nonetheless, $TiO_2$ is characterized by mediocre initial activity for short contact times.

SUMMARY OF THE INVENTION

Accordingly, a major object of the present invention is the provision of an improved catalyst for the catalytic conversion of those sulfur compounds typically present in industrial gases, which improved catalyst displays a high initial catalytic activity over short contact times in the aforesaid known reactions for the elimination of organic sulfur compounds. Briefly, the present invention features certain catalytic formulations based on cerium oxide.

DETAILED DESCRIPTION OF THE PREFERRED EMBODIMENTS OF THE INVENTION

More particularly according to the present invention, the subject catalysts may be formulated in any one of a number of forms for the conversion of industrial gases.

In a first embodiment, the catalyst of the invention is characterized in that it is a solid material comprised of cerium oxide.

Also in this first embodiment, the solid catalyst may also comprise at least one oxide selected from among titanium oxide, zirconium oxide, aluminum oxide, and the oxides of the rare earths.

In a second embodiment of the invention, the catalyst comprises a cerium oxide-based support having an active catalytic phase deposited thereon.

Consistent with this second embodiment, the supported active catalytic phase may comprise at least one oxide selected from among titanium oxide, aluminum oxide, zirconium oxide, and the rare earth oxides.

In a third embodiment, the catalyst comprises a support having a cerium oxide phase deposited thereon. This support may be selected from among aluminum oxide, titanium oxide, zirconium oxide, and the rare earth oxides.

As above indicated, the characterizing feature of the catalysts of the invention is that they contain cerium oxide.

The cerium oxide, moreover, may be prepared by any known means.

It may be prepared, in particular, by heating in air and at a temperature of from 400° C. to 1000° C., ceric hydroxide or certain oxygen salts of cerium, such as the nitrates, sulfates, carbonates, oxalates, acetates, etc. [see Paul Pascal, *Novel Treatise of Inorganic Chemistry*, Vol. VII, p. 777 (1959)].

It may also be prepared according to the process described by Horsley, Towner and Waldron [preprint, *Symo. Eur. Metall. Poudres*, th. 1, Paper I2, (1975)]wherein cerium (IV) oxide is produced by the thermal decomposition of cerium (III oxalate.

Also compare Mikhail, Gabr and Fahin, *J. Appl. Chem.*, 20, 7, 222–225 (1970), wherein the structure and properties of particular ceric oxide were studied, such ceric oxide having been produced by treatment of a solution of cerous nitrate with ammonia in the presence of hydrogen peroxide.

Ceric oxide may itself comprise the catalysts of the invention, or it may be admixed with other elements and, in particular, with catalytically active elements. The amount of cerium oxide may thus range from 0.5% and 100% by weight relative to the final catalyst.

Among the catalytically active elements, titanium dioxide is especially representative. Formulations based specifically on titanium oxide and cerium oxide have particularly high initial activity over short contact times.

In these particular formulations, the respective amounts of the titanium dioxide and cerium oxide may vary over wide limits. Strictly by way of example, formulations containing from 5 to 80% and preferably from 5 to 30% by weight cerium oxide are well suited for catalytic conversion according to the invention.

Exemplary of another catalytically active element is aluminum oxide. The amounts of aluminum oxide and cerium oxide may again vary over wide limits, specifically those indicated above for titanium oxide.

Zirconium oxide is another catalytically active compound. Again, the respective amounts of the various oxides are as indicated above, and more particularly ranging from 5 to 25% by weight of cerium oxide.

The oxides of the rare earths, such as, for example, of lanthanum, neodymium and praseodymium, are also exemplary of the other catalytically active element.

It will of course be appreciated that a plurality of these oxides can be used.

In another embodiment of the invention, the cerium oxide may be used together with one or more additives adapted for th stabilization of its specific surface at elevated temperatures.

Advantageously, these additives are oxides of silicon, thorium and the rare earths.

The abovementioned additives for the stabilization of the specific surface of the subject catalysts are employed in amounts generally ranging from approximately 1 to 10% by weight of the oxide relative to the total weight of the cerium and the additive oxide, preferably from 2 to 5%.

During the preparation of the catalyst, these additives are typically introduced in the form of precursors thereof.

Still further, depending on the form in which the catalyst is produced, it is possible to include in its formulation certain molding additives. These additives are conventionally used in molding operations. In admixture to form a paste, these additives impart rheological properties suitable for molding. As examples of such additives, the following are representative: cellulose, carboxymethylcellulose, carboxyethylcellulose, tall oil, surface active agents, flocculating agents such as the polyacrylamides, carbon black, starches, stearic acid, polyacrylic acid, polyvinyl alcohol, glucose, polyethylene glycol.

Finally, these additives are incorporated in amounts ranging from 0.1 to 15% by weight relative to the final catalyst.

It is also possible to employ supplemental components to improve the mechanical properties of the formulations. These components may be selected from among the clays, silicates, alkaline earth sulfates and ceramic fibers. These components may be used in amounts by weight, relative to the final catalyst, of up to 99.5%, preferably up to 60% and more preferably up to 30%.

The catalysts according to the invention may be prepared by any known process appropriate for producing either a solid catalyst, or a catalytic phase deposited onto a support.

The solid products may thus be produced by the molding of a mixture containing the components of the catalyst as defined above.

A water based mixture is obtained by kneading together a powder containing the oxide or hydrated oxide of cerium and the other additives of above type, as the case may be, and, optionally, molding agents, and the oxides or hydrated oxides of the other catalytically active elements.

By "hydrated oxides" are intended those compounds of the formula $MO_x(OH)_y \cdot zH_2O$, wherein M is Ce, Ti, Zr, Al or a rare earth.

The mixture obtained in this manner is then molded. The molding process may provide articles having different shapes, for example, spherical, cylindrical, solid or hollow extrusions, in particular of cylindrical profile, tri-lobal, quatra-lobal or multi-lobal, and also products in the form of tablets, spheres, pellets, granules, monoliths and particularly honeycombs, etc., having different dimensions. They may be specifically produced using a tabletting machine, a rotating granulator, an extrusion molding machine, a pellet shaping machine, or a combination of an extrusion molding machine with a rotating granulator.

Solid or hollow multi-lobal shaped articles are particularly advantageous according to this invention.

In a last stage, the products obtained in this manner are dried and optionally calcined.

It is possible to thus prepare, in particular, solid articles based on ceric oxide alone, on ceric oxide with additives t stabilize its specific surface and compound catalysts based on cerium oxide, zirconium oxide, titanium oxide, aluminum oxide and the oxides of the rare earths, optionally together with the aforesaid additives.

A different technique may be employed to produce supported catalysts, in particular catalysts comprising a support with cerium oxide deposited thereon, or conversely, comprising a cerium oxide support and having a different catalytic phase deposited thereon, for example, a phase comprised of titanium oxide, aluminum oxide, zirconium oxide and the oxides of the rare earths.

The support may be prepared and shaped as described above from a mixture of oxide and hydrated oxide powders, the elements mentioned above, and, optionally, molding additives and supplemental constituents for improving mechanical properties.

The support produced in this manner can then be impregnated or coated to deposit the supported phase. The impregnation or coating process is carried out in known manner by contacting the support with a solution, a sol or a gel containing the oxides or the precursors of the oxides constituting the active supported phase.

It is thus possible to impregnate or coat a support based on at least one oxide selected from among titanium oxide, aluminum oxide, zirconium oxide and at least one oxide of a rare earth, with a precursor of cerium oxide.

In another embodiment, a support of the above type is coated with cerium oxide or a precursor of cerium oxide, the coating process optionally being preceded or followed by impregnation with a cerium compound and/or an oxide of aluminum, titanium, zirconium, or at least one rare earth.

It too is possible to prepare the catalysts of the invention by coprecipitation or cogelation of the component elements.

Finally, the catalytic formulations described above may be produced on monolithic metal or ceramic shaped articles. These may consist, in particular, of one or more refractory oxides, preferably in the form of a film or coating applied to a monolith of the above type, said monolith preferably being in the form of an inert and rigid honeycomb structure, comprising channels or conduits. Such supports are well known to this art and are widely described in the literature.

The refractory oxides are, in particular, selected from among the oxides of magnesium, calcium, strontium, barium, scandium, the lanthanides, indium, thallium, silicon, titanium, hafnium, thorium, germanium, lead, vanadium, niobium, tantalum, chromium, molybdenum, tungsten and rhenium.

The metal monoliths are especially those produced from alloys of chromium, aluminum and cobalt, such as those known by the trademark KANTHAL or those obtained from alloys of iron, chromium, aluminum and yttrium and known under the trademark FECRALLOY. The metal may also be carbon steel or simple cast iron.

The ceramic monoliths used are, in particular, those containing as their principal material cordierite alumina, mullite, zirconium, zirconmullite, barium titanate, porcelain, thorium oxide, magnesium oxide, steatite, boron or silicon carbide.

The cellular structure of the honeycomb may be of a hexagonal, tetragonal, triangular or undulating shape; it must permit the passage of gas within the channels or conduits formed during its fabrication, whether by extrusion, rolling, solidification of the elements in the forms of sheets, etc.

The catalysts according to the invention may be used for the treatment of industrial gases containing sulfur compounds and specifically in Claus catalysis. The Claus process has been described above. The catalysts of the invention are also particularly effective for the treatment of gases containing organosulfur compounds by the hydrolysis schemes represented by the above reactions (2), (3) and (4), such gases emanating from a Claus process or from different origins.

In order to further illustrate the present invention and the advantages thereof, the following specific examples are given, it being understood that same are intended only as illustrative and in nowise limitative.

EXAMPLE 1

This example illustrates the preparation of an alumina catalyst according to the prior art (Catalyst 1).

The catalyst was produced by the rapid dehydration, at 800° C., of a Bayer hydrate. The flash dried product was ground and agglomerated in a pill making machine. The resulting spheres were aged at 100° C. for 12 hr and then calcined at 500° C. for 4 hr. The final catalyst had the following characteristics:
(i) Sphere diameter: 4mm
(ii) SBE (specific surface): 250 $m^2/g$
(iii) TPV (total pore volume): 0.48 $cm^3/g$

EXAMPLE 2

This example also illustrates the preparation of a catalyst of the prior art (Catalyst 2). To a titanium dioxide suspension, obtained after hydrolysis and filtration in conventional manner of the sulfuric acid decomposition of ilmenite, a suspension of lime was added to neutralize the entirety of the sulfates. The suspension was dried at 150° C. for one hour. The resulting powder was mixed for 2 hr in the presence of water and nitric acid in the following proportions:
(i) Titanium dioxide: 58%
(ii) $HNO_3$: 2%
(iii) $H_2O$: 40%

The mixture was then extruded through a die having a diameter of 3.2 mm. The extrusions were dried at 120° C. for 3 hr, then calcined at 450° C. for 2 hr.

The characteristics of the final catalyst were the following:
(i) Extrusion diameter: 3 mm
(ii) SBE: 120 $m^2/g$
(iii) TPV: 0.35 $cm^3/g$

EXAMPLE 3

This example illustrates the preparation of a catalyst according to the invention (Catalyst 3).

A mass of 700 g of alumina spheres produced by the process described in Example 1 was impregnated with 340 $cm^3$ of a solution of ceric nitrate, at a concentration of 225 g cerium per liter. The product was dried at 120° C. for 6 hr, then calcined at 550° C. for 2 hr.

The characteristics of the final catalyst obtained were the following:
(i) Sphere diameter: 4 mm
(ii) SBE: 195 $m^2/g$
(iii) TPV: 0.42 cc/g

EXAMPLE 4

This example also illustrates the preparation of a catalyst according to the invention (Catalyst 4).

To a suspension of titanium dioxide, obtained after hydrolysis and filtration in conventional manner of the sulfuric acid decomposition of ilmenite, a suspension of lime was added to neutralize the entirety of the sulfates. The suspension was dried at 150° C. for 1 hr. The resulting powder was mixed with a cerium hydroxide powder obtained by the precipitation of ceric nitrate with ammonia, for 2 hr in the presence of water and nitric acid, in the following proportions:
(i) Titanium dioxide: 40%
(ii) Cerium hydroxide: 17%
(iii) $HNO_3$: 3%
(iv) $H_2O$ 40%

The mixture was then extruded through a die having a diameter of 3.2 mm. The extrusions were dried at 120° C. for hr, then calcined at 450° C. for 2 hr.

The characteristics of the final catalyst were the following:
(i) Extrusion diameter: 3 mm
(ii) SBE: 102 $m^2/g$
(iii) TPV: 0.30 cc/g

EXAMPLE 5

This example also illustrates the preparation of a catalyst according to the invention (Catalyst 5).

A solution of cerous nitrate having 800 g/1 of cerium was calcined at 150° C. for 24 hr. The resulting cake was mixed for 2 hr in the presence of water and nitric acid, in the following proportions:
(i) Cerium hydroxide: 63%
(ii) $HNO_3$: 3%
(iii) $H_2O$: 34%

The mixture was extruded and the extrusions were dried at 120° C. for 10 hr, then calcined at 400° C. for 3 hr. The final catalyst had the following characteristics:
(i) Extrusion diameter: 3 mm
(ii) SBE: 70 $m^2/g$
(iii) TPV: 0.25 $cm^3/g$

EXAMPLE 6

This example illustrates a catalytic test comparing the activities, in Claus conversion and hydrolysis of $CS_2$, of the above different catalysts under the following conditions:
(i) Composition of the gas
    $H_2S$ 6%
    $SO_2$ 4%
    $CS_2$ 1%
    $H_2O$ 30%
    $N_2$ 59%

(ii) VVH=900 h$^{-1}$
(iii) Reactor inlet temperature: 225° C.
(iv) Reactor outlet temperature: 340° C.

The output gases were analyzed by gaseous phase chromatography.

The results obtained using the catalysts described in the examples, prior to and after aging, for 15 hours of operation, 5 hours of which was under 5000 VPM of oxygen, respectively in Claus catalysis and $CS_2$ hydrolysis, are reported in Tables I and II. The numbers given represent the degree of conversion in %. t,0160 t,0170

An examination of the results reported in Table I and Table II clearly shows the superiority of the catalysts of the invention relative to the catalyst of the prior art.

In particular, the especially high activity over a short contact time of the catalysts of the invention in the elimination/hydrolysis of $CS_2$ is noted. Results identical to those obtained in the elimination of $CS_2$ are also found for the elimination of COS.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the desulfurization of industrial gases by the catalytic conversion of contaminating sulfur values therein, comprising a Claus reaction and the hydrolysis of organosulfur compounds, said process comprising utilizing as the catalyst therefor, a solid cerium oxide.

2. The desulfurization process as defined by claim 1, said cerium oxide catalyst further comprising at least one of the oxides of titanium, aluminum, zirconium and the rare earths.

3. The desulfurization process as defined by claim 1, the catalyst comprising a cerium oxide support substrate having an active catalytic phase deposited thereon.

4. The desulfurization process as defined by claim 3, said active catalytic phase comprising at least one of the oxides of titanium, aluminum, zirconium and the rare earths.

5. The desulfurization process as defined by claim 1, the catalyst comprising a support substrate having a catalytically active cerium oxide phase deposited thereon.

6. The desulfurization process as defined by claim 5, said support substrate comprising a monolithic shaped article.

7. The desulfurization process as defined by claim 6, said monolithic shaped article comprising a metal or ceramic.

8. The desulfurization process as defined by claim 5, said support substrate comprising at least one of the oxides of titanium, aluminum, zirconium and the rare earths.

9. The desulfurization process as defined by claim 1, said catalyst comprising a solid or hollow multilobal shaped article.

10. The desulfurization process as defined by claim 1, said catalyst comprising from 0.5 to 100% by weight of cerium oxide.

11. The desulfurization process as defined by claim 1, said catalyst further comprising at least one additive oxide of silicon, thorium and the rare earths.

12. The desulfurization process as defined by claim 11, said catalyst comprising from 1 to 20% by weight of said additive oxide.

13. The desulfurization process as defined by claim 1, said catalyst further comprising a clay, silicate, alkaline earth metal sulfate or ceramic fiber.

14. The desulfurization process as defined by claim 1, said catalyst comprising solid ceric oxide.

* * * * *